(12) United States Patent
Eldering

(10) Patent No.: US 7,039,932 B2
(45) Date of Patent: May 2, 2006

(54) QUEUE-BASED HEAD-END ADVERTISEMENT SCHEDULING METHOD AND APPARATUS

(75) Inventor: Charles A. Eldering, Doylestown, PA (US)

(73) Assignee: Prime Research Alliance E., Inc., Tortola (VG)

( * ) Notice: Subject to any disclaimer, the term of this patent is extended or adjusted under 35 U.S.C. 154(b) by 1124 days.

(21) Appl. No.: 09/742,534

(22) Filed: Dec. 21, 2000

(65) Prior Publication Data

US 2002/0083442 A1    Jun. 27, 2002

Related U.S. Application Data

(60) Provisional application No. 60/229,156, filed on Aug. 31, 2000.

(51) Int. Cl.
*H04N 7/10* (2006.01)
*H04N 7/025* (2006.01)

(52) U.S. Cl. .......................................... 725/35; 725/34
(58) Field of Classification Search ................ 725/36, 725/34, 35
See application file for complete search history.

(56) References Cited

U.S. PATENT DOCUMENTS

| | | | |
|---|---|---|---|
| 4,602,279 A | 7/1986 | Freeman |
| 4,930,011 A | 5/1990 | Kiewit |
| 5,029,014 A | 7/1991 | Lindstrom |
| 5,099,319 A | 3/1992 | Esch |
| 5,155,591 A | 10/1992 | Wachob |
| 5,231,494 A | 7/1993 | Wachob |
| 5,271,626 A | 12/1993 | Llenas et al. |
| 5,319,455 A | 6/1994 | Hoarty et al. |
| 5,410,344 A | 4/1995 | Graves et al. |
| 5,424,770 A | 6/1995 | Schmelzer et al. |
| 5,425,100 A | 6/1995 | Thomas et al. |
| 5,446,919 A | 8/1995 | Wilkins |
| 5,534,911 A | 7/1996 | Levitan |

(Continued)

FOREIGN PATENT DOCUMENTS

CA    2264392    1/1999

(Continued)

OTHER PUBLICATIONS

NCTA Technical Papers "Compressed Digital Commercial Insertion: New Technology Architectures for the Cable Advertising Business" 1992 8 pages.

(Continued)

*Primary Examiner*—Chris Kelley
*Assistant Examiner*—James Sheleheda
(74) *Attorney, Agent, or Firm*—Technology Patents & Licensing, Inc.

(57) ABSTRACT

A method and apparatus for scheduling and inserting advertisements into a plurality of presentation channels in a communications network in which the presentation channels contain the same programming, but different advertisements. A single programming channel is split into a plurality of presentation channels. Different advertisements are inserted into the different presentation channels. The advertisements to be inserted into advertising avails are they are detected are determined by utilizing queues stored in memory corresponding to each presentation channel. Each queue comprises an ordered list of advertisement resource locators (ARLs), in which the order dictates which advertisement is to be inserted in the next advertising avail and in which the ARLs indicate at least the location from which the advertisement can be retrieved.

43 Claims, 6 Drawing Sheets

U.S. PATENT DOCUMENTS

| | | | | |
|---|---|---|---|---|
| 5,550,578 | A * | 8/1996 | Hoarty et al. | 725/120 |
| 5,559,549 | A | 9/1996 | Hendricks et al. | |
| 5,579,055 | A | 11/1996 | Hamilton et al. | |
| 5,585,858 | A | 12/1996 | Harper et al. | |
| 5,600,364 | A | 2/1997 | Hendricks et al. | 348/1 |
| 5,600,366 | A | 2/1997 | Schulman | |
| 5,600,573 | A | 2/1997 | Hendricks et al. | |
| 5,604,542 | A | 2/1997 | Dedrick | |
| 5,612,742 | A | 3/1997 | Krause et al. | |
| 5,621,728 | A | 4/1997 | Lightfoot | |
| 5,636,346 | A | 6/1997 | Saxe | |
| 5,650,994 | A | 7/1997 | Daley | |
| 5,652,615 | A | 7/1997 | Bryant et al. | |
| 5,661,516 | A | 8/1997 | Carles | |
| 5,724,091 | A | 3/1998 | Freeman et al. | |
| 5,724,521 | A | 3/1998 | Freeman et al. | |
| 5,740,549 | A | 4/1998 | Reilly et al. | |
| 5,752,160 | A | 5/1998 | Dunn | |
| 5,752,238 | A | 5/1998 | Dedrick | |
| 5,758,257 | A | 5/1998 | Herz et al. | |
| 5,758,328 | A | 5/1998 | Giovanni | |
| 5,761,601 | A | 6/1998 | Nemirofsky | |
| 5,774,170 | A | 6/1998 | Hite | |
| 5,781,226 | A | 7/1998 | Sheehan | 348/6 |
| 5,790,426 | A | 8/1998 | Robinson | |
| 5,790,935 | A | 8/1998 | Payton | 455/5.1 |
| 5,801,747 | A | 9/1998 | Bedard | |
| 5,801,753 | A | 9/1998 | Eyer et al. | |
| 5,808,694 | A | 9/1998 | Usui et al. | |
| 5,815,671 | A | 9/1998 | Morrison | |
| 5,848,352 | A | 12/1998 | Dougherty et al. | |
| 5,861,919 | A | 1/1999 | Perkins et al. | |
| 5,886,731 | A | 3/1999 | Ebisawa | |
| 5,917,830 | A | 6/1999 | Chen et al. | |
| 5,918,014 | A | 6/1999 | Robinson | |
| 5,926,205 | A | 7/1999 | Krause et al. | |
| 5,931,901 | A | 8/1999 | Wolfe et al. | 709/206 |
| 5,948,061 | A | 9/1999 | Merriman et al. | |
| 5,966,120 | A | 10/1999 | Arazi | |
| 5,969,715 | A | 10/1999 | Dougherty et al. | |
| 5,978,381 | A | 11/1999 | Perlman et al. | |
| 5,990,927 | A | 11/1999 | Hendricks | |
| 6,002,393 | A | 12/1999 | Hite et al. | |
| 6,002,394 | A | 12/1999 | Schein | |
| 6,009,409 | A | 12/1999 | Adler et al. | |
| 6,009,410 | A | 12/1999 | LeMole | |
| 6,020,880 | A | 2/2000 | Naimpally | |
| 6,020,883 | A | 2/2000 | Herz et al. | |
| 6,026,368 | A | 2/2000 | Brown et al. | 705/14 |
| 6,026,369 | A | 2/2000 | Capek | 705/14 |
| 6,029,045 | A | 2/2000 | Picco et al. | 455/5.1 |
| 6,038,256 | A | 3/2000 | Linzer et al. | |
| 6,061,097 | A | 5/2000 | Satterfield | |
| 6,088,722 | A | 7/2000 | Herz et al. | |
| 6,119,098 | A * | 9/2000 | Guyot et al. | 705/14 |
| 6,141,010 | A | 10/2000 | Hoyle | |
| 6,144,653 | A | 11/2000 | Persson et al. | |
| 6,160,570 | A | 12/2000 | Sitnik | |
| 6,160,989 | A | 12/2000 | Hendricks et al. | |
| 6,177,931 | B1 | 1/2001 | Alexander et al. | |
| 6,181,334 | B1 | 1/2001 | Freeman et al. | |
| 6,252,634 | B1 * | 6/2001 | Yuen et al. | 348/731 |
| 6,253,238 | B1 | 6/2001 | Lauder | |
| 6,263,501 | B1 | 7/2001 | Schein | |
| 6,357,042 | B1 * | 3/2002 | Srinivasan et al. | 725/32 |
| 6,378,130 | B1 * | 4/2002 | Adams | 725/95 |
| 6,418,122 | B1 | 7/2002 | Schoenblum | |
| 6,425,131 | B1 | 7/2002 | Crandall | |
| 6,434,747 | B1 | 8/2002 | Khoo | |
| 6,446,082 | B1 | 9/2002 | Arita | |
| 6,446,261 | B1 | 9/2002 | Rosser | |
| 6,459,427 | B1 | 10/2002 | Mao | |
| 6,463,585 | B1 * | 10/2002 | Hendricks et al. | 725/35 |
| 6,487,721 | B1 * | 11/2002 | Safadi | 725/36 |
| 6,493,875 | B1 | 12/2002 | Eames et al. | |
| 6,505,169 | B1 | 1/2003 | Bhagavath et al. | |
| 6,516,002 | B1 | 2/2003 | Huang | |
| 6,583,825 | B1 | 6/2003 | Yuen et al. | |
| 6,615,039 | B1 | 9/2003 | Eldering | |
| 6,631,523 | B1 | 10/2003 | Matthews | |
| 6,675,385 | B1 | 1/2004 | Wang | |
| 6,684,194 | B1 | 1/2004 | Eldering et al. | |
| 6,698,020 | B1 | 2/2004 | Zigmond et al. | |
| 6,704,930 | B1 | 3/2004 | Eldering et al. | |
| 6,718,551 | B1 | 4/2004 | Swix | |
| 6,724,974 | B1 | 4/2004 | Naruto | |
| 6,738,978 | B1 | 5/2004 | Hendricks | |
| 6,796,555 | B1 | 9/2004 | Blahut | |
| 6,820,277 | B1 | 11/2004 | Eldering et al. | |
| 2001/0013124 | A1 | 8/2001 | Klosterman et al. | |
| 2002/0026645 | A1 | 2/2002 | Son | |
| 2002/0038455 | A1 | 3/2002 | Srinivasan | |
| 2002/0083439 | A1 | 6/2002 | Eldering | |
| 2002/0083443 | A1 | 6/2002 | Eldering | |
| 2002/0087975 | A1 | 7/2002 | Schlack | |
| 2002/0087976 | A1 | 7/2002 | Kaplan | |
| 2002/0104083 | A1 | 8/2002 | Hendricks | |
| 2002/0129374 | A1 | 9/2002 | Freeman | |
| 2002/0152471 | A1 | 10/2002 | De Haas | |
| 2003/0088872 | A1 | 5/2003 | Maissel et al. | |
| 2003/0200128 | A1 * | 10/2003 | Doherty | 705/8 |

FOREIGN PATENT DOCUMENTS

| | | |
|---|---|---|
| WO | WO9712486 | 4/1997 |
| WO | WO9717774 | 5/1997 |
| WO | WO9827723 | 6/1998 |
| WO | WO 9926415 A1 * | 5/1999 |
| WO | WO9952285 | 11/1999 |
| WO | WO9965237 | 12/1999 |
| WO | WO9966719 | 12/1999 |
| WO | WO0005888 | 2/2000 |
| WO | WO0054504 | 9/2000 |
| WO | WO0069163 | 11/2000 |
| WO | WO0147279 | 6/2001 |
| WO | WO0049801 | 10/2001 |
| WO | WO0233973 | 4/2002 |
| WO | WO0233975 | 4/2002 |

OTHER PUBLICATIONS

AdLink Engineering, Ad insertion wiring diagrams, 1999, 17 pages.

U.S. Appl. No. 09/204,888, Charles A. Eldering.

U.S. Appl. No. 09/635,539, Charles A. Eldering.

U.S. Appl. No. 09/712,790, Charles A. Eldering.

* cited by examiner

| MAC ID 105 | GROUP 103 |
|---|---|
| E135642X579864HJ | B |
| E135642X579865HJ | C |
| E135642X579866HJ | D |
| E135642X579867HJ | D |
| E135642X579868HJ | A |
| ⋮ | ⋮ |
| E135642X579954HJ | D |
| E135642X579955HJ | A |
| E135642X579956HJ | A |

| PROGRAM CHANNEL | PRESENTATION CHANNELS | VPI/VCI |
|---|---|---|
| CBS | CBS<br>CBS_A<br>CBS_B<br>CBS_C<br>.<br>.<br>.<br>CBS_N | 234/345<br>234/346<br>234/347<br>234/348<br>.<br>.<br>.<br>234/XXX |
| FOX | FOX<br>FOX_A<br>FOX_B<br>FOX_C<br>.<br>.<br>.<br>FOX_N | 456/123<br>456/124<br>456/125<br>456/126<br>.<br>.<br>.<br>456/XXX |
| .<br>.<br>. | | |
| UPN | UPN<br>UPN_A<br>UPN_B<br>UPN_C<br>.<br>.<br>.<br>UPN_N | 895/587<br>895/588<br>895/589<br>895/590<br>.<br>.<br>.<br>895/XXX |

*FIG. 1B*

| PRESENTATION STREAM | VPI/VCI | CHANNEL NO. |
|---|---|---|
| CBS_C | 234/348 | 4 |
| FOX_C | 456/126 | 5 |
| . . . | | |
| UPN_C | 895/590 | 6 |

*FIG. 1C*

QUEUE-BASED HEAD-END ADVERTISEMENT SCHEDULING METHOD AND APPARATUS

RELATED APPLICATION

This patent application is based on and claims priority to U.S. Provisional Patent Application No. 60/229,156, filed on Aug. 31, 2000, entitled "Method and System for Addressable and Program Independent Advertising", which application is incorporated herein by reference.

FIELD OF THE INVENTION

The invention pertains to advertising. More particularly, the invention pertains to targeted advertising in television programming or other media delivery systems.

BACKGROUND OF THE INVENTION

As used herein, the term "television service delivery system" refers to any method and/or apparatus for delivering television programming to viewers, including, but not limited to, digital broadcast satellite (DBS), analog cable networks, digital cable networks, switched digital video (SDV) networks delivered via a telephone connection, and land-based radio frequency antenna broadcast.

The various modes of delivering television service, including those mentioned above, are herein termed "transport mechanisms" or "transport streams". The term "television service provider" refers to an entity that provide television service delivery systems, e.g., a local cable television company in the case of analog or digital cable. The term "subscriber" refers to any individual, household or other entity that receives television service from a television service provider. In almost all television service delivery systems other than land-based antenna broadcasts, the subscriber actually enters into a service contract with the television service provider in order to subscribe to the television service. In land-based antenna television service, anyone with a television in the geographic area reached by the broadcaster can receive the television service without any contract with the broadcaster. Nevertheless, in this specification, the term "subscriber" is intended to include such entities. The term head-end refers to the node of the network or other television service delivery system from which television programming is transmitted to the receiving nodes, i.e., to the subscriber nodes.

Television service delivery systems typically deliver a plurality of channels of television programming to subscribers. The subscribers, through channel selection via a set-top box (STB) or through the tuner of the television itself, select one or more of those channels to view at any given time. Traditionally, television service providers transmit the same data on each channel to all of its subscribers. Specifically, each programming channel contains the exact same content, including advertisements, for all subscribers.

Many television service delivery systems, including analog cable, digital cable, DBS and SDV employ STBs that the subscriber must couple between the incoming signal (e.g., the cable, antenna or telephone line) and his or her television set(s). These STBs can provide substantially enhanced functionality to the television service provider as well as the subscriber. For instance, the STBs can be programmed to either allow or not allow the subscriber to view certain programming channels. As is well known to any cable television subscriber, certain channels are considered premium channels and cost extra to receive. Thus, if a person selects to receive certain premium channels, the subscriber's STB is programmed to descramble those channels (if transmitted in a scrambled format) or otherwise not block the subscriber's ability to view them.

Most television channels include both programming and advertisements interspersed throughout the programming. Typically, a particular advertiser will purchase a particular "spot", i.e., an advertising opportunity in a particular channel at a particular time, based on the likelihood that members of that advertiser's target audience will be watching that particular channel at that particular time. For instance, advertisers typically have a particular demographic group of individuals that they wish to reach with their advertising. For example, the manufacturer of a low-cost beer probably has a primary target audience of males between the ages of 21 and 39, living in households with a household annual income of less than $75,000 per year. As another example, a manufacturer of laundry detergent may have a primary target audience of women between 19–59 years of age with no particular preference regarding household income. As another example, a manufacturer of expensive beer may wish to have a target audience similar to that of the manufacturer of low-cost beer in that it comprises males between the ages of 21 and 39. However, this manufacturer's target demographic audience may include a different economic profile, e.g., males between the ages of 21 and 39, living in households with annual household incomes of over $60,000 per year. Another advertiser that manufactures children's toys appropriate for children between 5 and 10 years of age might have a target audience of children between the ages of 5 and 10 and, depending upon the particular toys, a desired annual household income range.

Factors such as time of day and the particular program that is being broadcast on a particular channel can be used as predictors of the type of persons likely to be watching the television and particular channel when a particular advertisement is displayed. For instance, children are more likely to be viewing television during the daytime than adults. Further, men are more likely to be watching sporting events than women. However, time of day and type of program are not perfect indicators of the viewing audience. For instance, Monday Night Football traditionally would be considered a program/timeslot that would present advertisers with a large number of male viewers between the ages of 21 and 39. However, those viewers are likely to span the entire annual household income range. Accordingly, a large portion of the target audiences of both the low-cost beer manufacturer and the premium beer manufacturer can be expected to view Monday Night Football. However, by the same token, both beer manufacturers will pay a premium price to advertise during Monday Night Football, even though a large portion of the audience does not comprise their target audience. For instance, the premium beer manufacturer will be reaching many men living in households within a lower income range who are unlikely to purchase the premium beer because of its high cost. That manufacturer nevertheless pays the premium price for that advertising spot.

Accordingly, it is an object of the present invention to provide an improved method and apparatus for advertising in television and other media.

It is another object of the present invention to provide a method and apparatus for more narrowly reaching one's target audience in television advertising.

It is a further object of the present invention to provide a method and apparatus by which advertisements can be inserted into television programming channels in a more targeted fashion than traditional advertising mechanisms.

SUMMARY OF THE INVENTION

The invention is a method and apparatus for delivering targeted advertising to persons who receive a media stream such as television. While the invention is particularly suitable for use in connection with television service delivery systems, and particularly those utilizing STBs or the equivalent, it can be applied to other media streams such as the Internet, and audio-only streams that might be delivered via DBS, analog cable, digital cable or SDV.

In accordance with the invention, for each channel containing different television programming, a television service provider transmits multiple versions of that channel in which the programming is identical but the advertisements are different. This allows television service providers to offer advertisers more targeted advertising other than simply based on channel, time of day, and programming. For instance, a single programming channel, e.g., VH1, can be duplicated four times at the head end of a television service network to create four presentation channels. Different advertisements can be inserted into each of the four presentation channels with the different presentation channels delivered to different groups of subscribers. The subscriber groups may be grouped by nodes of a cable television network with the provider delivering the different presentation channels to different nodes.

Alternately, subscriber groups may be created by transmitting all presentation channels to all subscribers, but individually programming the set-top boxes of the individual subscribers to pick out a particular one of the multiple presentation channels corresponding to each programming channel. The set-top boxes can be programmed before being delivered to the subscribers or can be programmed by the provider via the communication network after they are coupled to the network by the subscriber.

In accordance with the invention, the television service provider inserts different advertisements into the different presentation channels at the head end using a queue-based method and apparatus. In accordance with the invention, a queue of advertisement resource locators (ARLs) is maintained for each transmitted presentation channel. In a simple embodiment, there is one queue for each presentation channel. The ARLs comprise information disclosing the location of a corresponding advertisement. The actual advertisements are stored elsewhere and preferably are stored in a digital format such as MPEG. They may be stored in a memory local to the head end of the television service delivery system or may be stored elsewhere accessible by the head end computer system via the television service delivery network or a separate communication network. At the simplest level, ARLs essentially comprise pointers to the actual advertisements.

ARLs are stacked in the queue in the order in which they are to be inserted into the corresponding programming channel. The avails in the programming channel within which the advertisements are to be inserted are determined by any reasonable means and the advertisements are inserted within those avails. For example, the television service provider may be given data in advance disclosing where the avails are in the programming channel. In other embodiments, the beginning of avails may be indicated by a predetermined signal in the vertical blanking interval of the video stream or by cue tones.

BRIEF DESCRIPTION OF THE DRAWINGS

FIG. 1A is an exemplary system-wide advertisement group map in accordance with the present invention that may be stored at the head end for transmission to the set-top boxes in order to enable the set-top boxes to formulate their own individual channel maps.

FIG. 1B is an exemplary system-wide channel map that may be stored at the head end for transmission to the set-top boxes for purposes of creating their individual channel maps.

FIG. 1C is an exemplary individual channel map for a particular STB in accordance with the present invention.

DETAILED DESCRIPTION OF THE INVENTION

Figure 2:
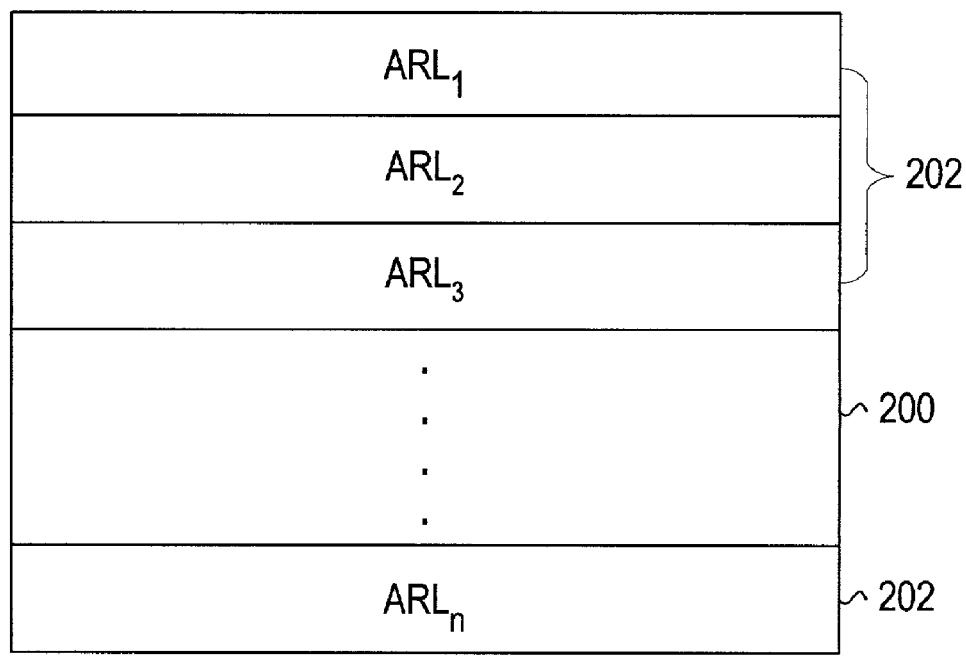
FIG. 2 is a logic diagram illustrating an advertisement resource locator queue stored in memory in accordance with the present invention.

In accordance with the invention, a television service provider (TSP) receives a plurality of television programming channels (e.g., ABC, NBC, CBS, FOX, UPN) containing television programming as well as spaces interspersed within the programming for advertisements. Such advertisement intervals are herein termed "avails". Some, all or none of the avails may be filled with advertisements as delivered to the television service provider, while some all or none of the avails may be empty with the intent that the TSP insert advertisements into them. The advertisement insertion scheme of the present invention may be used to insert advertisements either into only the empty avails in a programming channel or to replace some or all of the advertisements that are already in some of the avails as delivered to the TSP.

One or more of the incoming programming channels is replicated, for example, by an audio/video splitter circuit, to produce multiple identical output channels. The same process is repeated for any number of other programming channels.

In accordance with a preferred embodiment of the invention, the selection of the particular presentation channel when a viewer selects a particular programming channel is transparent to the subscriber/viewer. That is, the subscriber selects only a particular programming channel, e.g., ABC, and the set-top box picks a particular one of the multiple presentation channels corresponding to ABC, e.g., ABC_1, ABC_2, ABC_3 or ABC_4.

This can be accomplished in many ways depending on the available bandwidth for transmitting television channels to the subscribers, the particular transport mechanism and other factors. In one scheme preferable for high bandwidth transport mechanisms such as analog cable, digital cable and DBS, all of the presentation channels are transmitted over a high bandwidth mechanism and each of the subscribers has a set-top box or other mechanism programmed to select one of the presentation channels corresponding to each programming channel.

A similar scheme can be employed in an SDV system with slight modification. As is well known, in SDV systems, in which bandwidth is much more limited than in cable systems, typically only one or a few channels can be transmitted to a subscriber at any given time. Accordingly, whenever a subscriber selects a programming channel to view, a signal is sent from the subscribers STB to the head-end or to a curb side node of the network asking for the selected channel to be transmitted to the subscriber. Accordingly, in SDV systems, the scheme may be essentially identical to that described above for cable networks, except that, instead of picking out the particular presentation channel corresponding to the selected programming channel for the advertising group to which that subscriber has been assigned, the STB is programmed to request the particular presentation channel from the head end. This SDV scheme can be implemented on commercially available SDV systems including the NLevel³ platform which is manufactured and sold by Next Level Communications.

In accordance with the invention, each subscriber is assigned to an advertising group wherein the assigned advertising group dictates which of the presentation channels corresponding to each programming channel that subscriber will receive when selecting that programming channel.

One preferred method is for each subscriber to have a set-top box which has stored in memory a tag identifying the advertising group to which it belongs. This tag may be programmed into the STB memory by the television service provider before it is delivered to the subscriber. Alternately, the STB may be programmed to accept data assigning it to a particular advertising group via the television service delivery system itself. In one embodiment, one channel in the transport mechanism (preferably a low bandwidth channel) can be reserved for sending advertising group assignments and other instructions to the set-top boxes.

Each set-top box can be assigned a unique identification code which can be used in conjunction with system-wide channel and advertising group maps received over the instruction channel to determine its advertising group. An advertising group map may be generated at the head end and transmitted over this instruction channel to all subscribers. FIG. 1A illustrates an exemplary advertising group map 101 that may be stored at the head end and transmitted via the instruction channel to all of the subscribers in an SDV television service system. The map identifies an advertising group 103 for every STB on the system. Each individual STB receives the map 101 and matches its identification number to an identification number 105 in the map to determine to which advertising group it belongs. FIG. 1B illustrates a presentation channel map 111 which also may be broadcast from the head end to all STBs. As shown in FIG. 1B, the presentation channel map identifies which presentation channel 113 for each programming channel 115 corresponds to which advertising group. It also identifies the information 117 needed by the STBs to tune into the particular presentation streams.

FIGS. 1A and 1B illustrate a presentation channel map for an SDV system utilizing the telephone lines and very high speed digital subscriber lines (VDSL) modems. As well known in the SDV art, the unique STB identifiers are Media Access Control Identifications (MAC_IDs) and the presentation channel tuning information 117 comprises a virtual identifier/virtual channel identifiers (VPI/VCIs) 117. In other systems such as analog cable, digital cable and DBS, the STB identifiers could take any reasonable form and the presentation channel information 117 could be the particular frequencies to which the individual presentation channels correspond, rather than VPI/VCI identifiers.

By correlating the data received in the advertising group map of FIG. 1A and the presentation channel map of FIG. 1B, each individual STB can create an individual channel map 121 for itself as illustrated in FIG. 1C.

FIG. 1C illustrates the map 121 which will be built by an STB assigned to advertising group C. The map indicates which particular VPI/VCI 123 (i.e., presentation channel 125) to select when the user selects a particular programming channel 127.

In systems which are not based on ATM but instead use analog video channels or digital video streams (e.g. MPEG) to transport video, the channel map will refer to a particular frequency (in the case of analog video) or a particular Program ID (PID) in the case of MPEG.

The particular advertising group to which each subscriber is assigned may be chosen by the television service provider based on available information about that subscriber that is relevant to the type of advertising most beneficial for that subscriber. Such information may include publicly available probabilistic demographic and/or psycho-graphic information based on the address of the subscriber. For instance, a handful of marketing firms in the United States provide information about fixed groups known as "clusters" for use by advertisers in identifying members of their target audiences. "Clusters", well known in the field of advertising, are groups of neighborhoods in the United States having certain similar characteristics such as socio-economic, demographic and/or psycho-graphic characteristics. To form clusters, these marketing firms have examined the characteristics of all known neighborhoods in the country using census or other publicly available data, have selected certain grouping characteristics (e.g., average family income, average family age, etc.) and have combined some of the neighborhoods with similar grouping characteristics into clusters. Examples of marketing firms known to provide "cluster" services are Claritas Inc., with its PRIZM™ cluster system identifiable by zip+4 codes, CACI INC., with its Acorn™ system, and National Decision Systems, Inc., with its Vision™ system.

Alternately or additionally, subscribers may simply be asked to fill out questionnaires disclosing such information such as age and gender, ethnicity and income of the members of the household when they sign up as subscribers with the television service provider.

In one embodiment of the invention, each programming channel is split into the same number of presentation channels as there are advertising groups. However, there is no requirement that all of the programming channels be split into multiple presentation channels or that those that are split into multiple presentation channels be split into the same number of presentation channels. In fact, there may be more advertising groups than presentation channels corresponding to any single programming channel.

In accordance with the present invention, the schedule for inserting advertisements into each of the presentation channels is achieved by using a queue stored in memory. FIG. 2 is a pictorial representation of a queue in accordance with the present invention. The queue 200 is a stacked list of advertisement identifiers, hereinafter termed advertisement resource locators (ARLs) 202. At a minimum, the ARLs indicate the location of a particular advertisement, which may be a memory address in a large volume memory local to the head end of the system. Alternately, the ARLs may point to a remote server on a network to which the head end computer is coupled. For instance, the advertisement may be stored at a remote location on the advertisers server, to which the television service provider is coupled via a network. Such an embodiment is advantageous in that any changes that the advertiser wishes to make to the advertisements, including substituting an entirely new advertisement for an older one, can be made by the advertiser on the advertiser's server any time before the advertisement is accessed for display, without the need for the television service provider's attention.

Preferably, the ARLs also indicate other information about the advertisement, such as the duration of the advertisement, the identity of the advertiser and the identity of the particular advertisement, which information may be useful for purposes of billing advertisers for display of their advertisements.

In a preferred embodiment of the invention, the queue comprises a stack of ARLs in the order in which they are to be inserted into the corresponding presentation channel. However, it will be understood by those of skill in the related arts that the "order" of the ARLs need not necessarily correspond to the numerical addresses of the ARLs in the queue, but encompasses any ordering algorithm that may be used to retrieve ARLs from the queue. For instance, the ARLs may include a time tag indicating the time that the corresponding advertisement is to be inserted into the presentation channel. U.S. patent application Ser. No. 09/635,542, entitled "Grouping Subscribers Based On Demographic Data", filed on Aug. 10, 2000, assigned to the same assignee as the present application and incorporated herein by reference, discloses a television service delivery method and apparatus into which the present invention can be incorporated.

Figure 3:
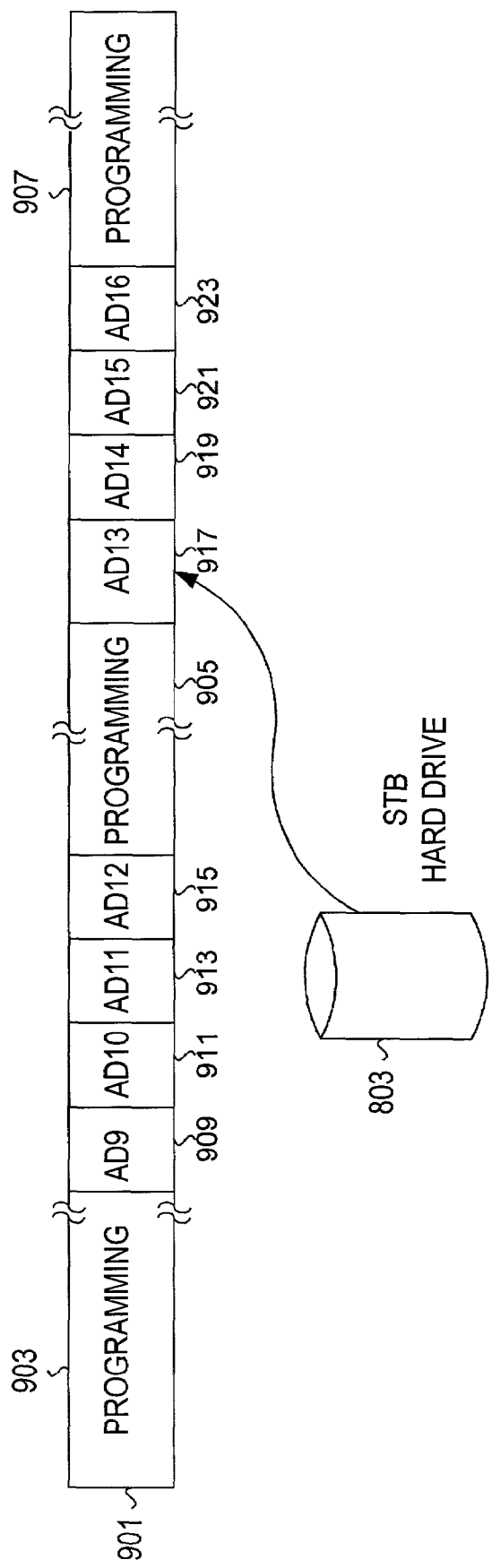
FIG. 3 is a logical representation illustrating advertisement insertion into a plurality of presentation channels corresponding to one programming channel in accordance with the present invention.

FIG. 3 illustrates dynamic substitution and insertion of advertisements in one presentation channel in accordance with the present invention. As shown in FIG. 3, there exists a first programming channel 901 having programming segments 903, 905, 907 and a plurality of advertisement segments (i.e., avails) 909, 911, 913, 915, 917, 919, 921, 923. The start of each avail is determined by any available scheme such as detection of digital cue tones, detection of a blank picture for a predetermined duration (which usually indicates the beginning of a commercial break in television programming), or detection of a predetermined signal in the vertical blanking interval. The aforementioned provisional application as well as U.S. patent application Ser. No. 09/712,790, filed on or about Nov. 14, 2000, entitled "Queue Based Advertisement Scheduling and Sales", incorporated herein by reference, discuss these and other ways of determining the location of avails in a programming channel. Alternately, the television service provider simply may have a schedule indicating the times of all upcoming avails in the programming channel.

When the beginning of an avail, e.g., avail 917, is detected or otherwise determined by the AIS in the data stream 901, the AIS retrieves the appropriate advertisement (as determined by consultation of the queue) from memory 803 and inserts it into the avail 917.

Figure 4:
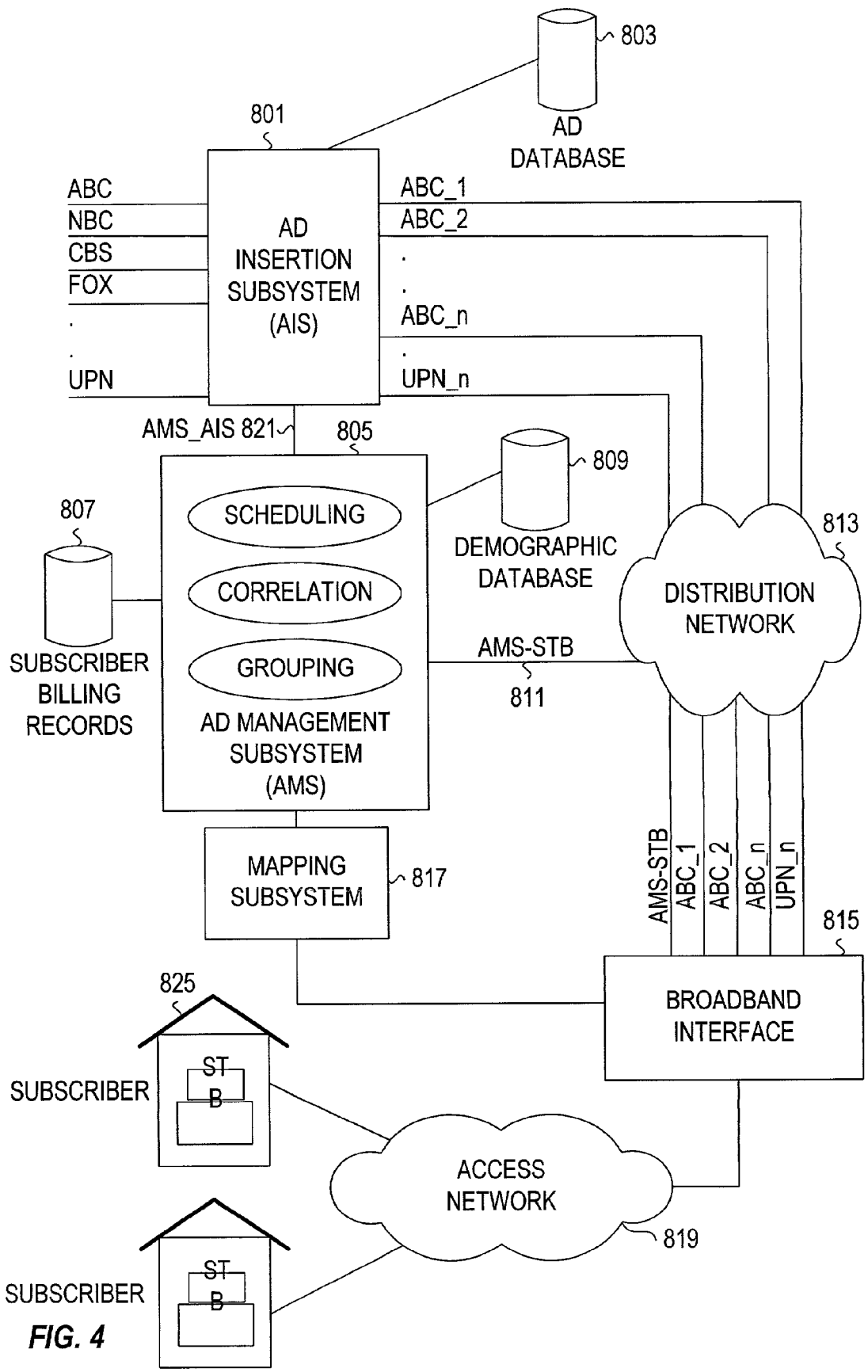
FIG. 4 is a block diagram of a queue-based, head-end advertisement scheduling and insertion apparatus in accordance with one embodiment of the present invention.

FIG. 4 is a block diagram of a head end advertisement insertion module in accordance with the present invention for an exemplary SDV system. FIG. 4 is merely exemplary of one particular potential embodiment of the invention and is not limiting. An advertisement insertion subsystem (AIS) 801 coupled to an advertisement management subsystem (AMS) 805 is provided. The AIS 801 receives one or more programming channels, e.g., ABC, NBC, CBS, FOX, UPN, and creates a plurality of presentation channels, e.g., ABC_1, ABC_2, . . . , ABC_n, NBC_1, NBC_2, . . . , NBC_n, . . . , UPN_1, UPN_2, . . . UPN_n, based upon instructions received from the AMS 805. Each programming channel comprises entertainment programming and one or more advertising avails within which the television service provider is to insert advertisements. The AIS 801 splits each incoming programing channel into a plurality of presentation channels, such as by passing the incoming programming channels through audio/video splitters (not shown).

The AMS 805 is coupled to a demographic database 809 and a subscriber billing records database 807, wherein the demographic database 809 may be one of the aforementioned commercially available databases having demographic information about subscribers.

The AIS 801 and the AMS 805 both are connected to a distribution network 813. The AIS 801 provides the multiplicity of presentation channels to the distribution network 813 and the AMS 805 provides instructions about advertising group associations of STBs, e.g., the afore described advertising group maps and channel maps, via an AMS_STB interface 811.

The AMS 805 also is connected to a broadband interface 815 via a mapping subsystem 817, wherein the mapping subsystem 817 assists in mapping different channels to different programming, e.g., STB group mapping.

The broadband interface 815 is connected to one or more subscribers 825 via an access network 819. In one embodiment, each subscriber 825 has an STB for the reception of entertainment programming and advertising.

The AIS 801 is responsible for creating n presentation channels from each selected programming channel, each presentation channel containing targeted advertisements corresponding to the presentation channel's advertising group.

The AIS 801 forms the presentation channels by "replicating" the programming channel into a plurality of presentation channels and inserting targeted advertisements into the advertisement avails in the presentation channels. In order to accomplish this targeted advertisement insertion, the AIS 801 receives from the AMS 805 instructions on which advertisements should go into which avails in each of the presentation channels. These instructions are derived from consultation with the queues as previously described. The AMS 805 also supplies instructions to the AIS 801, with reference to matching advertisements to avails, based on the prior sale and scheduling of those avail/advertisements combinations.

The AIS 801 must report to the AMS 805 exactly which advertisements were played in which avails and in which presentation channels such that the purchaser of the advertisement/avail combination can verify that the advertisement was successfully inserted and be billed for the completed transaction.

The AMS 805 has direct access to subscriber records, e.g., subscriber billing records. The subscriber billing records 807 provide the AMS 805 with the information regarding subscribers necessary for determining subscriber profiles and for the targeting of advertisements. For example, in order to optimally utilize the demographic data, a subscriber's ZIP+4 information is needed, and this information is derived from the actual physical address of the subscriber stored in the subscriber billing records 807.

To utilize the system of FIG. 4 in a switched digital video environment, a Media Access Control Identification (MAC_ID) of the STB (i.e., a unique identification of a particular STB) of each subscriber will also be needed. The unique MAC_ID is used by the broadband interface 815 to identify which STB is sending or is receiving information. The MAC_ID is needed so that the STB itself may be 'informed' about the relevant advertising group. As mentioned above, in one embodiment, a single and complete presentation channel map will be broadcast from a broadband terminal to many STBs. The individual STBs will compute their own individual channel maps based on the group to which they belong.

It is to be noted that increasing the number of presentation channels necessary to accomplish targeted advertising also results in an increased number of channels (i.e., VPI/VCIs) entering and switched by the broadband interface 815, and potentially received by the STB. The broadband interface 815 uses the presentation channel map such that it knows which actual presentation channel corresponds to each VPI/VCI. This map is also sent to the STBs so that the STBs can form their own individual channel maps according to their group, as previously described. The map between channels and VPI/VCIs is generally 'synchronized' between the broadband interface 815 and STB such that a channel change at the STB results in the correct switching of the presentation channel by the broadband interface 815.

As mentioned above, the presentation channel map is communicated to the broadband interface 815 via the mapping interface 817. The AMS 805, alternately, may contain the advertising grouping information about subscribers (and about their STBs).

As avails are determined in each presentation channel, the AMS 805 consults the queue corresponding to that presentation channel to determine which advertisement is to be inserted into that avail and informs the AIS 801. The AIS retrieves the advertisement from the large volume memory 803 and inserts it into the avail in the presentation channel.

There are numerous ways in which the advertisements can be inserted into the presentation channels that would be readily apparent to persons of skill in the related arts. For instance, a digitally controlled video switch may simply switch the source between the presentation channel and an advertising stream (from the large volume memory 803) at the beginnings and ends of avails. This insertion can also be accomplished using a number of commercially available units including those produced by the Sea Change Corporation and by nCube of Foster City, Calif., U.S.A.

The various blocks shown in FIG. 4 may be implemented by any reasonable circuitry, including, but not limited to, a programmed general purpose computer, a digital signal processor, an application specific integrated circuit, analog circuitry, a remote state machine or any combination of the above.

Countless alterations are possible in practicing the present invention. Depending upon a particular household, the individual advertising map created for the STB may be more complex than those illustrated in FIGS. 1A–1C, so that the STB selects presentation channels corresponding to different advertising groups depending on additional conditions such as time of day or the particular program. For instance, let us consider an example in which advertising group C is designed to probabilistically present advertisers with males between the ages of 21 and 39, while advertising group B is designed to probabilistically present advertisers with females between the ages of 21 and 39. If a household comprises a husband (who is most likely to be the viewer when the STB is tuned into a sports channel such as ESPN) and a wife (who is more likely to be the viewer when the STB is tuned into a programming channel like LIFETIME), the individual channel map for that subscriber should be different than for a household comprising two men rather than a husband and wife. Thus, the channel map for the former household may select the presentation channel corresponding to advertising group C (i.e., ESPN_C) for programming channel ESPN, and select the presentation channel corresponding to advertising group B (i.e., LIFETIME_B) for programming channel LIFETIME. The channel map for the latter household, on the other hand, may select the presentation channel corresponding to advertising group C for both ESPN and LIFETIME.

Alternately or additionally, the individual group map may be time-of-day dependent. For instance, if it is somehow probabilistically determined that, for a particular subscriber household, one or more viewers within a certain demographic category are likely to view the television during a certain time of day while individuals of a different demographic category view the television at a different time of day, the individual advertising map for that STB could include time dependent criteria.

Ordinarily, the advertising groups would comprise mutually exclusive sets of subscribers. However, it is possible for some overlap if additional criteria as discussed above are incorporated into the individual STB channel maps as long as the situation is avoided where one subscriber node belongs to two different advertising groups for the same time period and programming channel.

While the invention has hereinabove been described in connection with advertising in television service delivery systems, it can be applied in connection with the insertion of any data into any media stream regardless of sources as long as the information stream passes through a circuit that can perform the functions described above of the advertisement insertion module 801. Thus, for instance, the invention is equally applicable to analog cable, regular earth-based broadcast television, the Internet, or a data stream from any type of memory device, including compact disks, digital video disks, other optical media, magnetic disks, ROM, RAM, etc.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of transmitting television programming and advertising from a head end to subscribers at a plurality of subscriber nodes, said method comprising the steps of:
   (a) creating a plurality of subscriber groups, members of said subscriber groups being based on at least one characteristic of said subscribers relevant to advertising;
   (b) receiving at least one programming channel of television programming;
   (c) forming from said at least one programming channel a plurality of presentation channels of television programming, the plurality of presentation channels having programming identical to said at least one programming channel, each presentation channel corresponding to one of the subscriber groups;
   (d) storing a plurality of advertisements for insertion into advertising avails in said presentation channels;
   (e) storing for each presentation channel a queue comprising an ordered list of advertisement resource locators (ARLs), said ARLs comprising a pointer to a location of a corresponding advertisement;
   (f) determining advertising avails in each of said presentation channels;

(g) for each presentation channel, determining from said queue corresponding to said presentation channel an advertisement to be inserted in the advertising avails in said presentation channel;

(h) inserting said advertisement determined in step (g) into said corresponding avail;

(i) transmitting each of said presentation channels to at least those subscriber nodes in said subscriber group corresponding to said presentation channel; and (j) assigning each subscriber to one or more of the subscriber groups, wherein the assigning includes creating an advertising group map disclosing an advertising group to which each subscriber belongs and transmitting said advertising group map to said subscriber nodes.

2. The method of claim 1 wherein each subscriber group comprises a set of subscribers that is mutually exclusive of each other subscriber group.

3. The method of claim 1, wherein step (j) includes creating a presentation channel map disclosing to which advertising group each presentation channel corresponds and transmitting said presentation channel map to said subscriber nodes, wherein, responsive to receipt of said advertising group map, said subscriber nodes determine to which advertising group they belong, and, responsive to receipt of said presentation channel map, said subscriber nodes create an individual channel map dictating which of said plurality of presentation channels corresponding to said at least one programming channel said subscriber node is to select when a user of said subscriber node selects one of said programming channels to view.

4. The method of claim 3 wherein step (i) includes transmitting all of said presentation channels to all of said subscriber nodes.

5. The method of claim 4 wherein, responsive to a user making a channel selection corresponding to one of said programming channels, said subscriber nodes select one of said presentation channels corresponding to said programming channel selected by said user in accordance with said individual channel maps.

6. The method of claim 1 wherein said at least one programming channel includes indicators that identify the start of an avail in said at least one programming channel and wherein step (f) includes detecting said indicators.

7. The method of claim 1 wherein said advertisements are stored in digital form.

8. The method of claim 7 wherein said advertisements are stored in MPEG form.

9. The method of claim 7 wherein said at least one programming channel and said presentation channels are in digital format.

10. An apparatus for transmitting television programming and advertising from a head end of a communications system to subscribers at a plurality of subscriber nodes, the apparatus comprising:

a receiver for receiving a plurality of programming channels of television programming;

a plurality of splitters, each splitter coupled to receive one of said programming channels and split said programming channel into a plurality of presentation channels;

a first memory storing a plurality of advertisements for insertion into advertising avails in said presentation channels;

a second memory storing, for each presentation channel, a queue comprising an ordered list of advertisement resource locators (ARLs), said ARLs comprising a pointer to a location of an advertisement;

a circuit for determining advertising avails in each of said presentation channels;

an advertisement management circuit coupled to said second memory and adapted to consult said queues to determine which advertisements are to be inserted in which avails in said presentation channels, wherein said advertising management circuit is configured to generate an advertising group map disclosing an advertising group to which each subscriber belongs;

an advertisement insertion circuit coupled to said presentation channels and adapted to insert said advertisements into said avails in accordance with the ordered lists as dictated by said queues; and a transmitter adapted to transmit each of said plurality of presentation channels to at least those subscriber nodes in at least one of a plurality of subscriber groups, the at least one group corresponding to said presentation channel wherein the advertisement management circuit causes said transmitter to transmit said advertising group map to said subscriber nodes.

11. The apparatus of claim 10 wherein said advertisement insertion circuit and said advertisement management circuit comprise digital circuits.

12. The apparatus of claim 11 wherein said advertisement insertion circuit and said advertisement management circuit comprise digital processors.

13. The apparatus of claim 10 wherein each presentation channel is assigned to one of the plurality of subscriber groups, members of said subscriber groups being based on at least one characteristic of said subscribers relevant to advertising.

14. The apparatus of claim 13 wherein each of the plurality of subscriber groups comprises a set of subscribers that is mutually exclusive of each other subscriber group.

15. The apparatus of claim 10 wherein said subscriber nodes comprise:

a receiver for receiving at least some of said presentation channels and said advertising group map;

a circuit for determining, based on said received advertising group map, to which advertising group the subscriber node belongs.

16. The apparatus of claim 15 wherein said advertising management circuit generates a presentation channel map disclosing to which advertising group each presentation channel corresponds, and causes said transmitter to transmit said presentation channel map to said subscriber nodes.

17. The apparatus of claim 16 wherein said subscriber nodes further comprise:

a circuit for generating, responsive to receipt of said presentation channel map, an individual channel map dictating which of said plurality of presentation channels corresponding to said at least one programming channel said subscriber node is to select when a user of said subscriber node selects one of said programming channels to view.

18. The apparatus of claim 17 wherein said transmitter transmits all of said presentation channels to all of said subscriber nodes.

19. The apparatus of claim 18 wherein said subscriber nodes further comprise:

a circuit for selecting, responsive to a user making a channel selection corresponding to one of said programming channels, one of said presentation channels corresponding to said programming channel selected by said user in accordance with said individual channel map.

20. The apparatus of claim 10 wherein said at least one programming channel includes indicators that identify the start of an avail in said at least one programming channel and wherein said advertisement insertion circuit detects said indicators.

21. The apparatus of claim 10 wherein said advertisement insertion circuit comprises a video switch.

22. A method of receiving at a subscriber node at least one channel of television programming and advertising from a head end of a television service delivery system, said method comprising the steps of:
 (a) assigning said subscriber node to an advertising group;
 (b) simultaneously transmitting a plurality of presentation channels via said television service delivery system to said subscriber node, the presentation channels corresponding to a programming channel, said programming channel comprising television programming and advertising avails, wherein said plurality of presentation channels contain identical programming and different advertising within said advertising avails;
 (c) storing, at said subscriber node, data indicating one of the presentation channels that corresponds to said advertising group;
 (d) based on said assigning, enabling said subscriber node to select, receive and cause to be displayed on a monitoring device said one of the presentation channels;
 (e) receiving a presentation channel map disclosing for each presentation channel how said subscriber node can select that presentation channel for reception and display on the monitoring device; and
 (f) creating an individual channel map for said subscriber node indicating which presentation channel to select in step (d).

23. The method of claim 22 wherein said data is received via said television service delivery system.

24. The method of claim 23 wherein said data is received in a dedicated channel of said television service delivery system.

25. The method of claim 22 wherein step (c) includes storing data indicating a frequency of said one of the presentation channels and step (d) includes tuning to a particular frequency corresponding to said selected one of the presentation channels.

26. The method of claim 22 wherein step (a) includes receiving a map via said television service delivery system mapping a plurality of subscribers to advertising groups and determining from said map to which advertising group said subscriber node belongs.

27. The method of claim 22 wherein the television service delivery system includes a plurality of programming channels, each programming channel having a plurality of corresponding presentation channels for selection, reception and display by said subscriber node.

28. An apparatus for receiving at a subscriber node a plurality of presentation channels of television programming and advertising from a head end of a television service delivery system, each presentation channel corresponding to an individual one of a plurality of programming channels, wherein each of the presentation channels that corresponds to the same one of said programming channels comprises the same programming content as the programming channel to which it corresponds, but different advertising content, said apparatus comprising:
 a memory at said subscriber node;
 an individual advertising group map stored in said memory indicating, for each of said programming channels, one of said corresponding presentation channels, wherein each of said programming channels comprises television programming and advertising avails, and wherein each of the presentation channels that correspond to the same one of said programming channels contains identical programming as the programming channel to which it corresponds and different advertising within said advertising avails;
 a circuit for receiving data via said television service delivery system from which said individual advertising group map can be created, wherein said data received by said circuit for receiving comprises a system wide advertising group map mapping said subscriber node to an advertising group and a presentation channel map disclosing for each presentation channel how said subscriber node can select one of said presentation channels;
 a circuit for generating said individual advertising group map from said received data, wherein said circuit for generating comprises circuitry for correlating said system wide advertising group map and said presentation channel map with said individual advertising group map to create said individual advertising group map;
 a circuit for enabling said subscriber node to select the one of said presentation channels dictated by responsive to an instruction selecting a programming channel for viewing; and
 a circuit for causing said selected presentation channel to be displayed on a monitoring device.

29. The apparatus of claim 28 wherein said circuit for receiving comprises circuitry for receiving said data in a dedicated channel of said television service delivery system.

30. The apparatus of claim 28 wherein said television service delivery system transmits said plurality of said presentation channels to said subscriber node simultaneously and wherein said circuit for selecting selects the one of said presentation channels based on said individual advertising group map.

31. The apparatus of claim 30 wherein said individual advertising group map indicates a frequency of said presentation channels and said circuit for causing said selected presentation channel to be displayed tunes to said frequency of said selected presentation channel as indicated by said individual advertising group map.

32. A method of receiving at a subscriber node at least one channel of television programming and advertising from a head end of a television service delivery system, said method comprising the steps of:
 (a) assigning said subscriber node to an advertising group and receiving a map via said television service delivery system mapping a plurality of subscribers to advertising groups and determining from said map to which advertising group said subscriber node belongs;
 (b) simultaneously transmitting a plurality of presentation channels via said television service delivery system to said subscriber node, the presentation channels corresponding to a programming channel, said programming channel comprising television programming and advertising avails, wherein said plurality of presentation channels contain identical programming and different advertising within said advertising avails;
 (c) storing, at said subscriber node, data indicating one of the presentation channels that corresponds to said advertising group; and (d) based on said assigning, enabling said subscriber node to select, receive and cause to be displayed on a monitoring device said one of the presentation channels.

33. The method of claim 32 wherein said data is received via said television service delivery system.

34. The method of claim 32 wherein said data is received in a dedicated channel of said television service delivery system.

35. The method of claim 32 further comprising:
   (e) receiving a presentation channel map disclosing for each presentation channel how said subscriber node can select that presentation channel for reception and display on the monitoring device; and
   (f) creating an individual channel map for said subscriber node indicating which presentation channel to select in step (d).

36. The method of claim 32 wherein step (c) includes storing data indicating a frequency of said one of the presentation channels and step (d) includes tuning to a particular frequency corresponding to said selected one of the presentation channels.

37. The method of claim 32 wherein the television service delivery system includes a plurality of programming channels, each programming channel having a plurality of corresponding presentation channels for selection, reception and display by said subscriber node.

38. A method of receiving at a subscriber node at least one channel of television programming and advertising from a head end of a television service delivery system, said method comprising the steps of:
   (a) assigning said subscriber node to an advertising group;
   (b) simultaneously transmitting a plurality of presentation channels via said television service delivery system to said subscriber node, the presentation channels corresponding to a programming channel, said programming channel comprising television programming and advertising avails, wherein said plurality of presentation channels contain identical programming and different advertising within said advertising avails;
   (c) storing, at said subscriber node, data indicating one of the presentation channels that corresponds to said advertising group; and
   (d) based on said assigning, enabling said subscriber node to select, receive and cause to be displayed on a monitoring device said one of the presentation channels, wherein the television service delivery system includes a plurality of programming channels, each programming channel having a plurality of corresponding presentation channels for selection, reception and display by said subscriber node.

39. The method of claim 38 wherein said data is received via said television service delivery system.

40. The method of claim 38 wherein said data is received in a dedicated channel of said television service delivery system.

41. The method of claim 38 further comprising:
   (e) receiving a presentation channel map disclosing for each presentation channel how said subscriber node can select that presentation channel for reception and display on the monitoring device; and
   (f) creating an individual channel map for said subscriber node indicating which presentation channel to select in step (d).

42. The method of claim 38 wherein step (c) includes storing data indicating a frequency of said one of the presentation channels and step (d) includes tuning to a particular frequency corresponding to said selected one of the presentation channels.

43. The method of claim 38 wherein step (a) includes receiving a map via said television service delivery system mapping a plurality of subscribers to advertising groups and determining from said map to which advertising group said subscriber node belongs.

\* \* \* \* \*

UNITED STATES PATENT AND TRADEMARK OFFICE
CERTIFICATE OF CORRECTION

PATENT NO. : 7,039,932 B2
APPLICATION NO. : 09/742534
DATED : May 2, 2006
INVENTOR(S) : Charles Eldering Page 1 of 1

It is certified that error appears in the above-identified patent and that said Letters Patent is hereby corrected as shown below:

1. Column 4, line 35, delete "some all" and replace with --some, all--;

2. Column 12, line 38, delete "map;" and replace with --map: and--;

3. Column 12, line 18, delete "channel wherein" and replace with --channel, wherein--;

Signed and Sealed this

Second Day of January, 2007

JON W. DUDAS
*Director of the United States Patent and Trademark Office*